(12) United States Patent
Hellandbrand, Jr. et al.

(10) Patent No.: US 6,522,709 B1
(45) Date of Patent: Feb. 18, 2003

(54) NUCLEAR IN-CORE INSTRUMENT (ICI) ASSEMBLY WITH COMPRESSED FLEXIBLE HOSE SHEATH

(75) Inventors: Patrick A. Hellandbrand, Jr., East Hartford, CT (US); Kenneth V. Margotta, Ellington, CT (US); Michael J. Sponzo, Windsor, CT (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/439,086

(22) Filed: Nov. 12, 1999

(51) Int. Cl.⁷ .............................................. G21C 17/00
(52) U.S. Cl. ...................... 376/254; 376/203; 376/245; 376/255
(58) Field of Search ................. 376/203, 245, 376/254, 255

(56) References Cited

U.S. PATENT DOCUMENTS

| | | | | |
|---|---|---|---|---|
| 3,879,612 A | * | 4/1975 | Foster et al. ................. | 250/370 |
| 4,129,851 A | * | 12/1978 | Podgorski .................... | 340/11 |
| 4,302,772 A | * | 11/1981 | Gillot .......................... | 358/100 |
| 4,495,810 A | * | 1/1985 | Tessarzik et al. ........... | 73/432 R |
| 4,668,038 A | * | 5/1987 | Burnett et al. .............. | 339/94 M |
| 4,780,267 A | * | 10/1988 | Todt, Sr. et al. ............ | 376/254 |
| 4,883,946 A | * | 11/1989 | Jacquier ...................... | 219/523 |
| 4,966,747 A | * | 10/1990 | Tower et al. ................ | 376/254 |
| 4,986,954 A | * | 1/1991 | Feurgard .................... | 376/254 |
| 5,225,149 A | * | 7/1993 | Banda ......................... | 376/255 |
| 5,227,123 A | * | 7/1993 | Baversten .................... | 376/260 |
| 5,272,734 A | * | 12/1993 | Clark et al. .................. | 376/260 |
| 5,305,357 A | * | 4/1994 | Ekeroth ....................... | 376/254 |
| 5,400,374 A | * | 3/1995 | Baversten .................... | 376/260 |
| 5,638,898 A | * | 6/1997 | Gu .............................. | 165/160 |
| 5,676,176 A | * | 10/1997 | Usui ........................... | 138/121 |
| 5,924,743 A | * | 7/1999 | Bonmartin et al. ........... | 285/15 |
| 6,061,488 A | * | 5/2000 | Lhuillier et al. ............. | 385/102 |

FOREIGN PATENT DOCUMENTS

| | | | | |
|---|---|---|---|---|
| FR | 2698713 | * | 6/1994 | ................ 376/260 |

* cited by examiner

Primary Examiner—Michael J. Carone
Assistant Examiner—Jack Keith

(57) ABSTRACT

A protective hose, and a method of making the same, for an in-core instrument assembly used in a nuclear reactor, including a first end that is hermetically sealed to a first member of in-core instrument assembly such as a bullet nose, a second end that is hermetically sealed to a second member of said in-core instrument assembly such as a seal plug, and a body portion that surrounds at least one detector in the in-core instrument assembly, and has flexible, corrugated outer and inner surfaces. The body portion includes a series of ribs having peaks. The hose is compacted in length to a degree that the peaks of the ribs are substantially adjacent to one another. The ribs also have side surfaces that decline from the peaks to valley portions that are disposed between the side surfaces. The hose is compacted in length to a degree that the side surfaces are completely in physical contact with one another.

9 Claims, 7 Drawing Sheets

NUCLEAR IN-CORE INSTRUMENT (ICI) ASSEMBLY WITH COMPRESSED FLEXIBLE HOSE SHEATH

FIELD OF THE INVENTION

The present invention relates to the field of nuclear reactors, and in-core instruments used to measure physical characteristics inside the nuclear reactors.

BACKGROUND OF THE INVENTION

In-core instruments (ICIs) are used to measure the power level and temperature of a nuclear reactor while it is in operation. In some reactors, the insertion of the ICIs into the reactor requires the ICIs to be traversed through complicated, winding guide paths to reach their final location.

The current technology uses a strip wound metal hose (SWMH) to contain the individual detectors included in an ICI assembly. The SWMH material is flexible and allows the ICI to negotiate the turns in a guide path as it is inserted into the reactor. However, the SWMH is not watertight and thus allows the reactor coolant water to be in direct contact with the detectors. Experience has shown that under certain circumstances the water can cause pitting and cracking in the wall of the detector. If water penetrates the detector wall, the detector will fail.

It is required that a minimum number of these detectors always function. If the minimum number of detectors is not functioning, the reactor can not operate at full power.

It is therefore an object of the present invention to provide a flexible housing for detectors that are part of an ICI. It is a further object of the invention to provide a housing that will prevent the detectors and other ICI assembly applications from becoming exposed to reactor coolant and the high-pressure conditions within the nuclear reactor.

SUMMARY OF THE INVENTION

It is an object of the present invention to meet the above-described needs and others. Specifically, it is an object of the present invention to provide a protective hose for an in-core instrument assembly used in a nuclear reactor. The hose includes a first end that is hermetically sealed to a first member of in-core instrument assembly such as a bullet nose, a second end that is hermetically sealed to a second member of said in-core instrument assembly such as a seal plug, and a body portion that surrounds at least one detector in the in-core instrument assembly, and has flexible, corrugated outer and inner surfaces. The body portion includes a series of ribs having peaks. The hose is compacted in length to a degree that the peaks of the ribs are substantially adjacent to one another. The ribs also have side surfaces that decline from the peaks to valley portions that are disposed between the side surfaces. The hose is compacted in length to a degree that the side surfaces are completely in physical contact with one another.

Because the ends of said hose are hermetically sealed to the in-core instrument assembly., the hose provides an airtight and watertight enclosure for the detector(s). The hose is made of a non-corrosive metal, such as stainless steel, to ensure that the enclosure retains its watertight and airtight features despite the harsh conditions inside a nuclear reactor.

It is a further object of the invention to provide a method for manufacturing an in-core instrument assembly, that includes the steps of providing a central tensile member, providing at least one detector in the vicinity of the central tensile member, providing a flexible hose having ribs that define corrugated inner and outer surfaces, surrounding the central tensile member and detector(s) with the hose, and hermetically sealing the ends of the hose to the in-core instrument assembly so that the detector(s) are enclosed in an airtight and watertight space.

The flexible hose is collapsed to reduce its length prior to the step of surrounding said central tensile member and said at least one detector with said hose. The ribs of the hose have peaks so that the hose, when collapsed, is compacted in length to a degree that the peaks are substantially adjacent to one another. Furthermore, the ribs have side surfaces that decline from the peaks to valley portions that are disposed between the side surfaces. When collapsed, the hose is compacted in length to a degree that the side surfaces are completely in physical contact with one another.

It is yet a further object of the invention to provide a method of manufacturing a flexible hose for an in-core instrument, which includes the steps of providing a flexible hose made of a non-corrosive material, having ribs that define a corrugated outer and inner surfaces, and subjecting the hose to a collapsing process, so that the hose is compacted in length. The ribs have peaks that define an outermost diameter of the hose, and side surfaces that decline from the peaks to valley portions that are disposed between the side surfaces. The portions of the inner surface of the hose that define the valley portions also define an innermost diameter of the hose. The hose has peaks and side surfaces that decline from the peaks to valley portions that are disposed between the side surfaces. When collapsed, the hose is compacted in length to a degree that the side surfaces are completely in physical contact with one another.

The collapsing process can be a hydro-collapse process, and includes the steps of fitting a rod inside of the hose, along the hose's length, and providing hydro-pressure to the hose. The method can also include the step of heat treating the hose prior to subjecting the hose to a collapsing process. The method can further include the step of sealing one end of the hose to a first member of the in-core instrument, and sealing the other end of the hose to a second member of the in-core instrument.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Using the drawings, the preferred embodiments of the present invention will now be explained.

Figure 1:
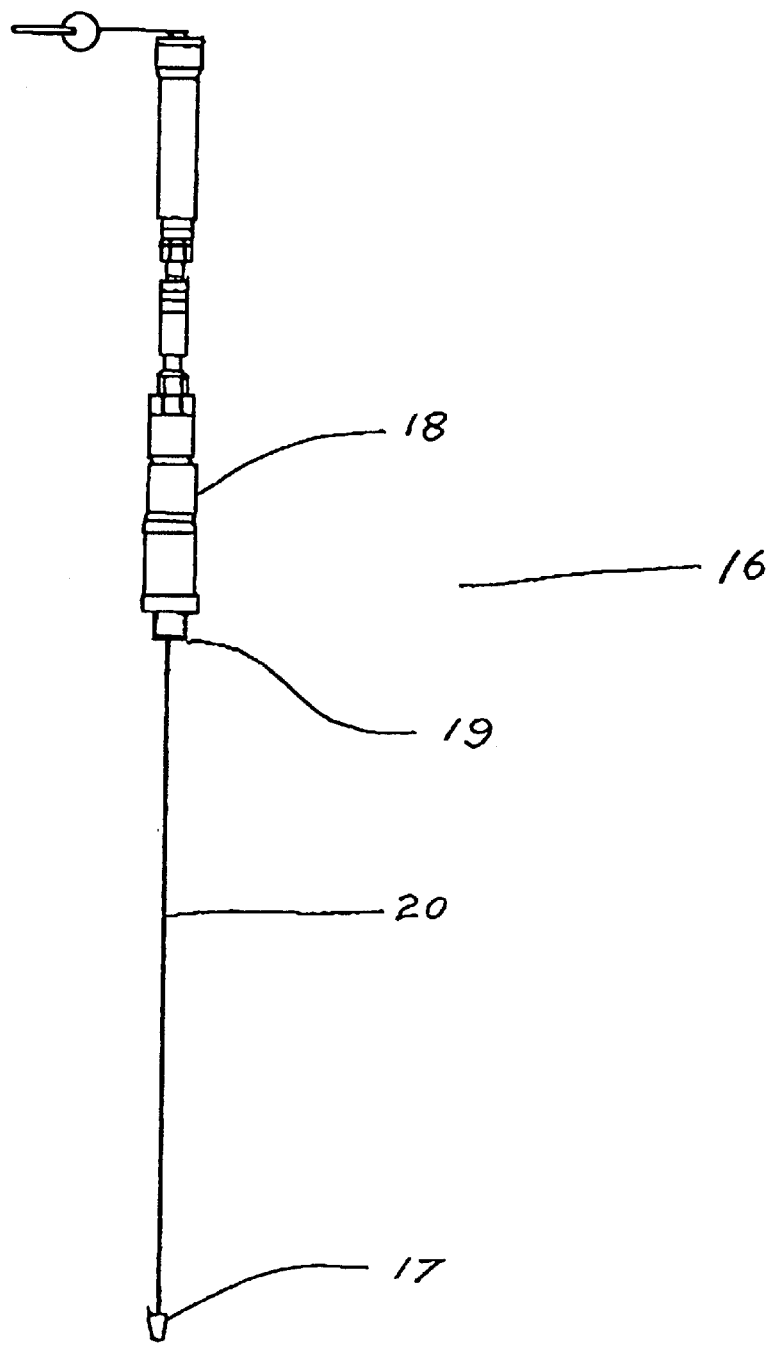
FIG. 1 shows an ICI assembly without sheathing attached thereto.
Figure 5:
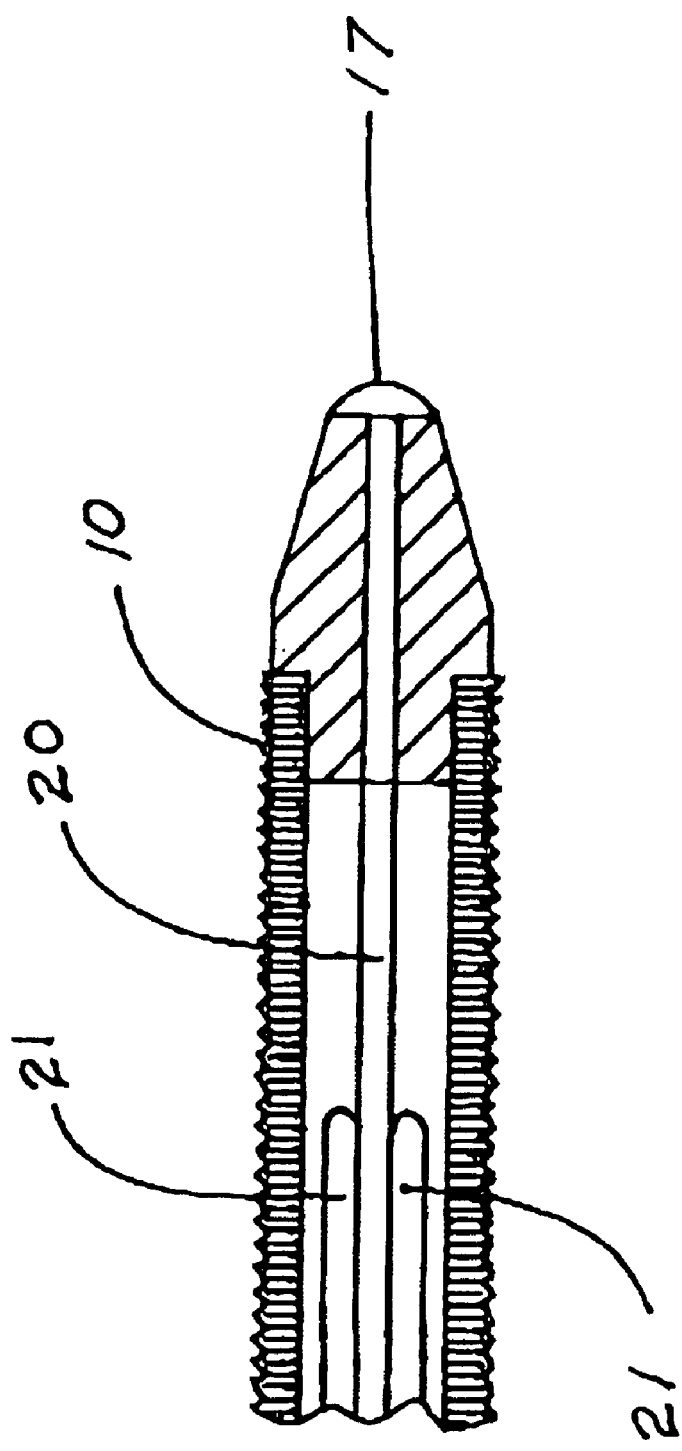
FIG. 5 is a cross sectional view of the front section of the ICI assembly with the hose of the present invention attached thereto.

FIG. 1 shows an ICI assembly 16 (compressed flexible hose 10 is removed for clarity) that is used to measure conditions such as the power level and temperature of a nuclear reactor while the reactor is in operation. The assembly 16 includes a bullet nose 17 with a rounded tip. The hard metallic bullet nose 17 is relatively narrowed compared with the rearward components of the assembly 16. The shape and size of the bullet nose 17 aids in guiding the assembly 16 through the tortuous bend guide paths found in many reactors. As shown in FIG. 5, a central tensile member 20 is at one end connected to the bullet nose 17, and extends into a central bore of the bullet nose 17. At the opposite end of the central tensile member 20 is a seal plug 18, to which the central tensile member 20 is connected..

A plurality of detectors 21 is disposed around the periphery of the central tensile member 20. The detectors 21 are shown in FIG. 5 according to the present invention. Each of the detectors 21 includes a signal wire and an emitter. The signal wire and emitter can be insulated using an insulation material such as $Al_2O_3$, and housed within a sheath made of a metallic material. If the detectors 21 are subjected to the liquid and the high-pressure environment inside the nuclear reactor, the detector sheath may become pitted and cracked. The sheath is especially vulnerable while it is being directed through the interior of the nuclear reactor to detect conditions within the reactor. If water penetrates a detector wall, that detector will fail.

A flexible outer hose 10 is provided to protect the detectors 21 and other nuclear applications within the ICI assembly from the harsh environment of the nuclear reactor during reactor operation. The hose 10 is pressure tight and, has properties that ensure that the interior of the hose is dry.

Figure 2:
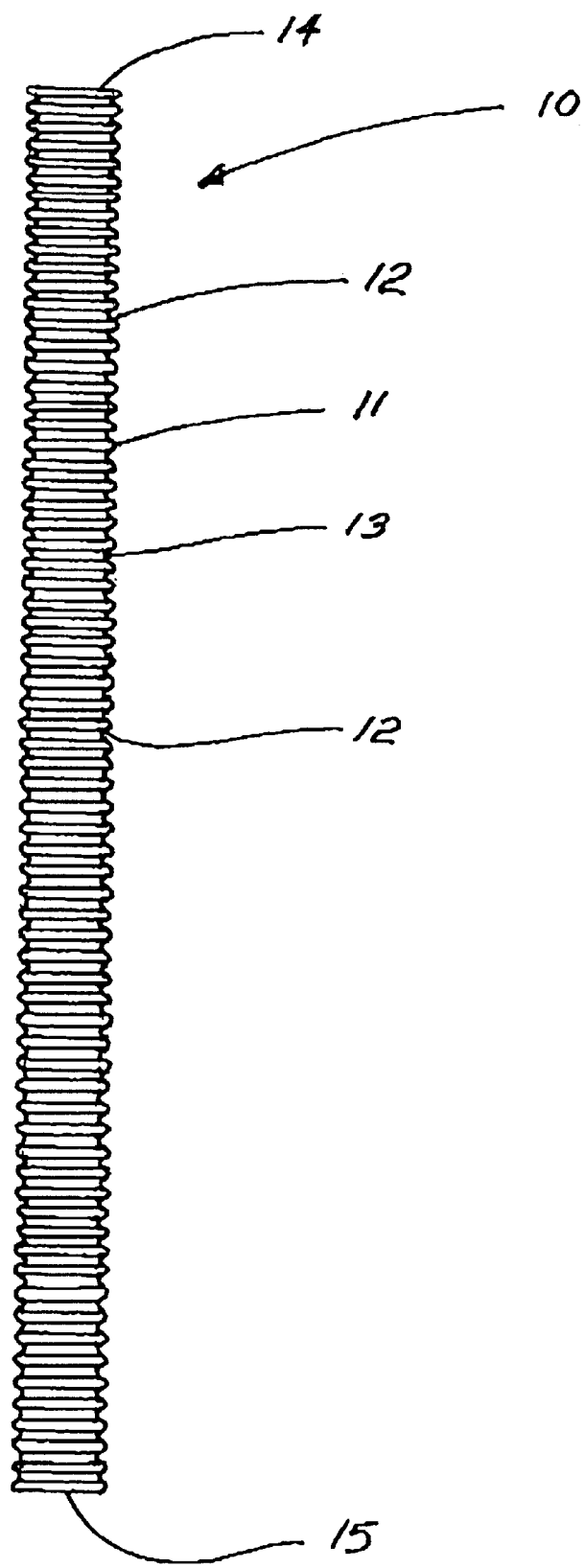
FIGS. 2 and 2a show a sheath of the present invention prior to being subjected to a hydro-collapse process, with FIG. 2a being an exploded view of FIG. 2.
Figure 2A:
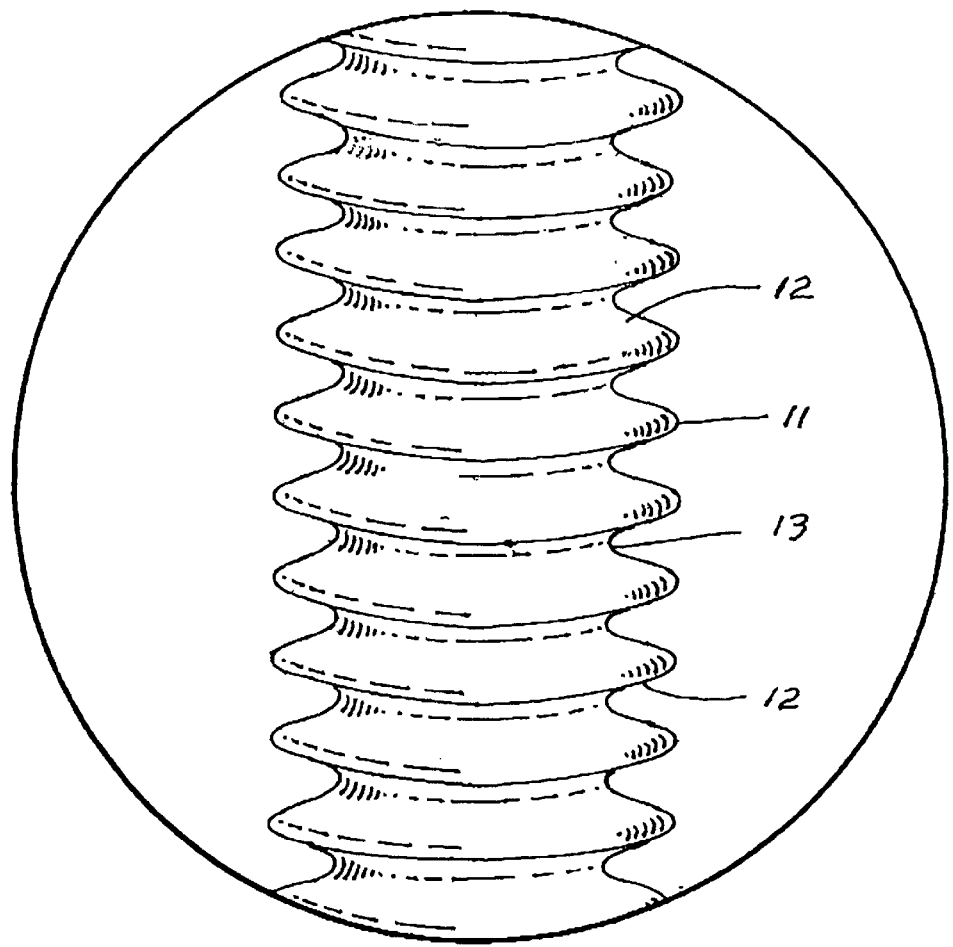

Specifically, the starting sheath material that makes up the hose is a flexible bellows type hose 10 shown in, FIGS. 2 and 2a, where FIG. 2a is a close-up view. The hose 10 is made of a watertight material, and is provided with corrugations or ribs that impart flexibility to the hose 10. Each rib has a peak 11 with sides 12, on either side of the peak 11, that each lead to a valley 13. The ends 14, 15 of the hose 10 will normally be attached to the ICI assembly 16 using a welding process, or other process that will provide a hermetic seal. Before the hose 10 is subjected to a collapse process, the sides 12 of the ribs are spaced apart from each other, and FIG. 1 represents the hose in its pre-collapsed form prior to being attached to the ICI assembly.

Figure 3:
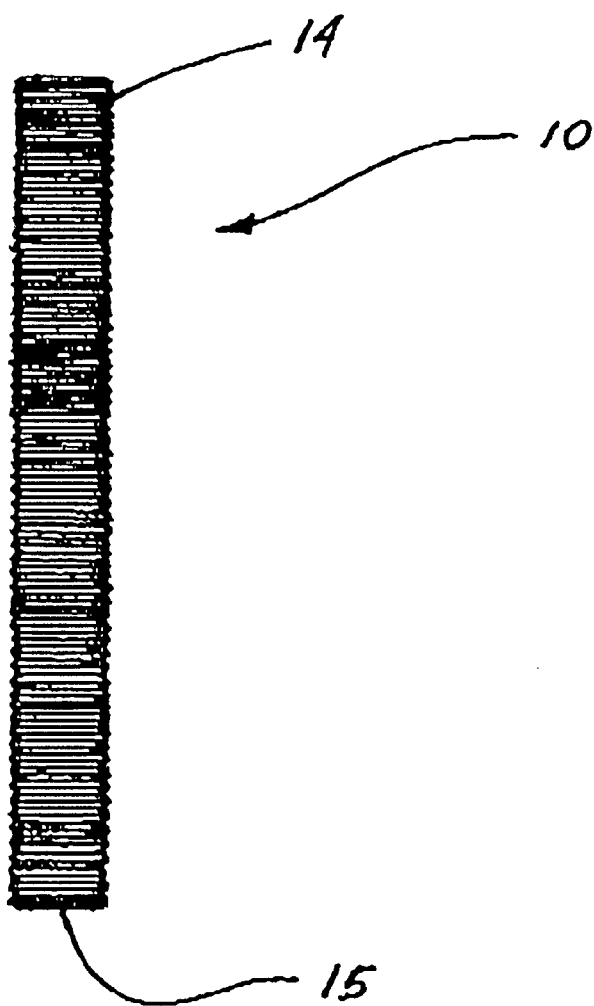
FIGS. 3 and 3a show a sheath of the present invention after being subjected to a hydro-collapse process, with FIG. 3a being an exploded view of FIG. 3.
Figure 3A:
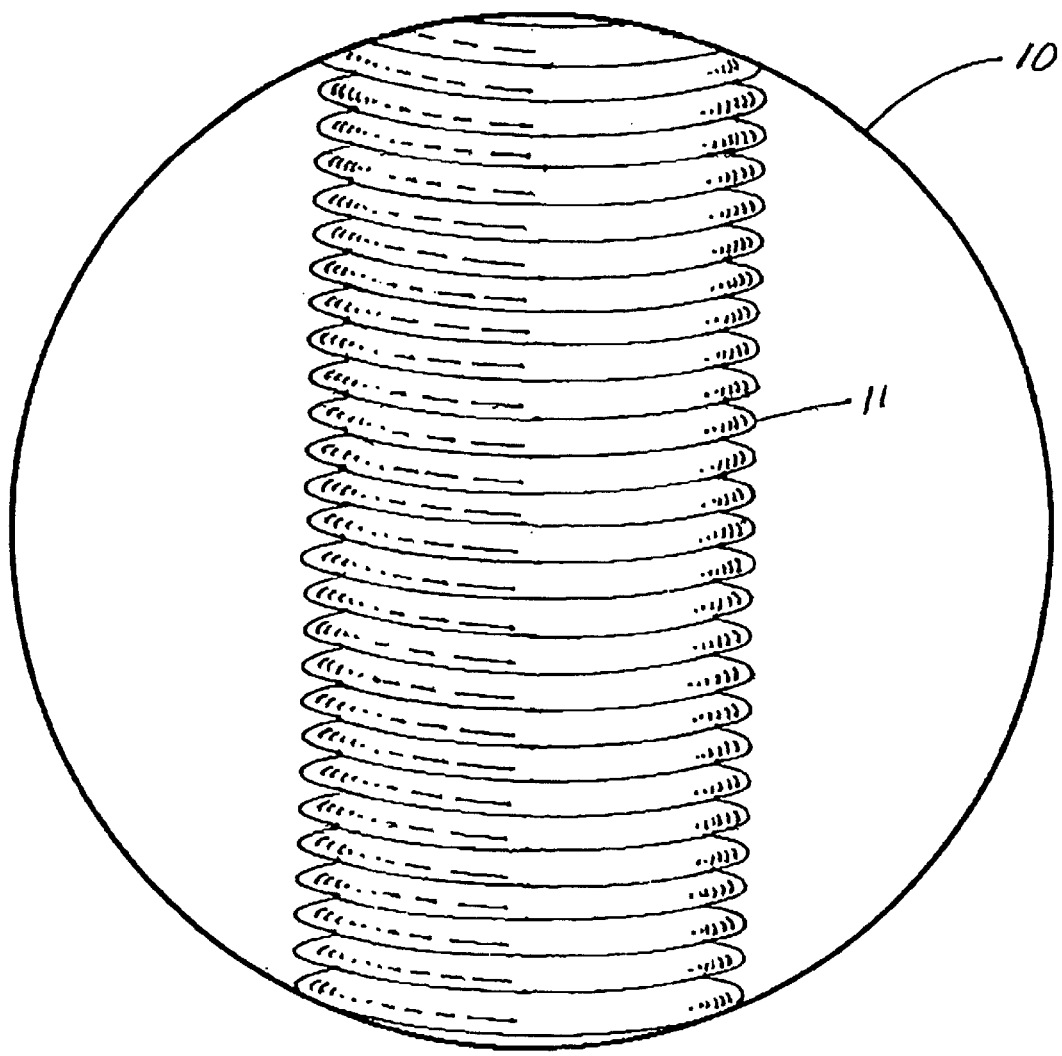

FIGS. 3 and 3a show the hose 10 after it has been collapsed and is ready to be attached to the ICI assembly 16. The hose 10 is collapsed using a hydro-collapse process that begins by placing the hose 10 in a hydro test fixture (not shown). A rod (not shown) is fitted to the inside of the hose. The rod is uniform in diameter, and extends along at least the entire length of the hose 10 to ensure that the hose 10 will collapse over its full length in a uniform manner during the hydro-collapse process. The rod is then sealed to one end of the hydro test fixture. Hydro-pressure is then applied to the hose 10 in the hydro test fixture, and the hose 10 collapses to the degree shown in FIG. 2, while the rod traverses outside the hydro test fixture. In its collapsed state, the hose 10 no longer has spaced apart ribs. The sides 12 of the ribs are no longer at an inclining angle relative to one another, and instead are in contact with one another. The peaks also are disposed substantially adjacent to one another and together form an outer diameter of the hose 10. The portions of the inner surface of the hose 10 that formed the valleys 13 also are disposed substantially adjacent to one another and together form the inner diameter of the hose 10.

In a preferred embodiment of the invention, a commercially available flexible bellows hose 10 of the type shown in FIGS. 2 and 2a initially had a maximum outer diameter of 0.3.90 inches, measured from the peaks 11 of the ribs. The minimum inner diameter, measured from the inner surface of the hose 10 at the innermost portion of the valleys, was measured at 0.250 inches. The hose 10 was subjected to a series of applications of heat and pressure, where the pressure application was preformed using the above-described hydro test fixture process. After repeating the heat and pressure applications two times, the hose 10 was measured again. The hose 10 was measured to be less than half its starting length. The maximum outer diameter, again measured from the peaks of the ribs, was 0.418 inches. The minimum innermost diameter, measured from the portions of the inner surface of the hose 10 that formed the valleys, was 0.235 inches.

Figure 4:
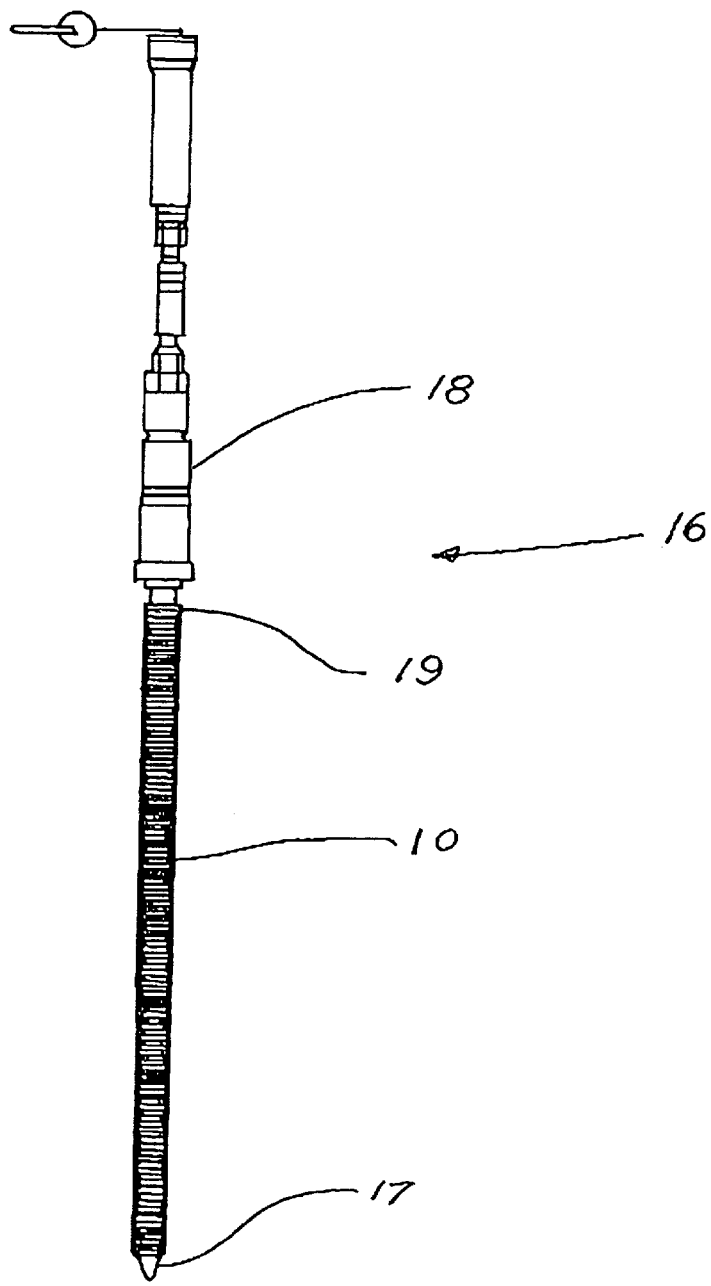
FIG. 4 shows an ICI assembly having a sheath of the present invention attached thereto.

Following the hydro-collapsing process, the hose 10 was hermetically sealed to the ICI assembly by, for example, a welding process. FIG. 4 shows the ICI assembly with the hose 10 of the present invention attached thereto. One end 14 of the hose 10 is attached to the bullet nose 17, while the opposite end 15 of the hose 10 is attached to the surface 19 of the seal plug 18 that is connected to the central tensile member 20. Accordingly, an airtight and watertight protection is provided to the detectors 21 by the hose 10 that surrounds the detectors 21 and the central tensile member 20. FIG. 5 shows a cross section of the front portion of the ICI assembly, showing the relationship between the hose 10, the central tensile member 20, the detectors 21, and the bullet nose 17.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. An in-core instrument assembly used on a nuclear reactor, which comprises:
   a first member having a first end and a second end;
   at least one detector;
   a bullet nose having an outer peripheral surface and connected to the first end of the first member, wherein the first end of the first member extends over a portion of the peripheral outer surface;
   a second member connected to the second end of the first member and having a seal plug with a surface; and
   a flexible hose comprising:

a first end, hermetically sealed to the bullet nose of the first member;

a second end, hermetically sealed to the surface of the seal plug of the second member; and a body portion extending from the first end to the second end of the hose that surrounds the at least one detector, and has flexible, corrugated outer and inner surfaces.

2. An in-core instrument assembly according to claim 1, wherein said body portion includes a series of ribs comprising peaks substantially adjacent to one another.

3. An in-core instrument assembly according to claim 2, wherein said ribs further comprise side surfaces that decline from said peaks to valley portions that are disposed between said side surfaces and are completely in physical contact with one another.

4. An in-core instrument assembly according to claim 1, wherein said hermetically sealed first and second ends of said hose provide an airtight and watertight enclosure for said at least one detector.

5. An in-core instrument assembly according to claim 1, wherein said hose is made of a non-corrosive metal.

6. An in-core instrument assembly according to claim 1, wherein said non-corrosive metal is stainless steel.

7. The in-core instrument assembly of claim 1 wherein said body portion includes a plurality of ribs that extend over a portion of the peripheral outer surface of the bullet nose.

8. The in-core instrument assembly of claim 7 wherein said plurality of ribs extending over the portion of the peripheral outer surface of the bullet nose are in contact with one another.

9. The in-core instrument assembly of claim 1 wherein the first end of the flexible hose is hermetically sealed to the bullet nose by a weld.

* * * * *